(12) United States Patent
Juricak et al.

(10) Patent No.: US 10,774,850 B2
(45) Date of Patent: Sep. 15, 2020

(54) HYDRAULIC SYSTEMS AND METHODS FOR POWERING AUXILIARY CIRCUITS

(71) Applicant: Caterpillar Inc., Peoria, IL (US)

(72) Inventors: Steven J. Juricak, New Hill, NC (US); David J. Lomax, Clayton, NC (US); Paul A. Rousseau, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/957,172

(22) Filed: Apr. 19, 2018

(65) Prior Publication Data

US 2019/0323525 A1    Oct. 24, 2019

(51) Int. Cl.
| | |
|---|---|
| *F15B 11/16* | (2006.01) |
| *F15B 11/17* | (2006.01) |
| *F15B 1/26* | (2006.01) |
| *F15B 21/00* | (2006.01) |
| *F15B 13/02* | (2006.01) |

(52) U.S. Cl.
CPC ............... *F15B 11/17* (2013.01); *F15B 1/26* (2013.01); *F15B 13/022* (2013.01); *F15B 21/005* (2013.01); *F15B 11/162* (2013.01); *F15B 2211/20576* (2013.01); *F15B 2211/781* (2013.01)

(58) Field of Classification Search
CPC .. F15B 11/162; F15B 13/022; F15B 2211/781
See application file for complete search history.

(56) References Cited

U.S. PATENT DOCUMENTS

| | | | |
|---|---|---|---|
| 4,044,786 A | * | 8/1977 | Yip ........................ F15B 11/162 137/101 |
| 4,262,580 A | | 4/1981 | Goff et al. |
| 4,422,290 A | | 12/1983 | Huffman |
| 4,453,451 A | | 6/1984 | Streeter et al. |
| 5,413,452 A | | 5/1995 | Lech et al. |
| 5,875,630 A | | 3/1999 | Walsh |
| 6,062,331 A | | 5/2000 | Grunow et al. |
| 6,205,781 B1 | | 3/2001 | A Hearn |

(Continued)

FOREIGN PATENT DOCUMENTS

| | | |
|---|---|---|
| EP | 1621684 | 1/2010 |
| EP | 2065519 B1 | 1/2011 |

(Continued)

*Primary Examiner* — F Daniel Lopez

(74) *Attorney, Agent, or Firm* — Schwegman, Lundberg & Woessner

(57) ABSTRACT

A hydraulic system for a machine includes a first pump, an implement pump, a control valve, and an auxiliary circuit. The first pump is configured to supply a first fluid flow to a first circuit, such as a steering circuit. The implement pump is configured to supply a second fluid flow to an implement circuit to actuate a primary implement function. The auxiliary circuit is configured to deliver fluid flow to actuate an auxiliary implement function. The auxiliary circuit is fluidly coupled to the implement circuit. The auxiliary circuit is also coupled to the first circuit by the control valve. The control valve is located downstream, in the direction of fluid flow, of the implement pump and the first pump. The control valve is configured to allow at least a portion of the first fluid flow to enter the auxiliary circuit and be delivered to the auxiliary implement function.

4 Claims, 4 Drawing Sheets

(56) References Cited

U.S. PATENT DOCUMENTS

| | | |
|---|---|---|
| 7,665,299 B2 | 2/2010 | Schuh et al. |
| 7,739,943 B2 | 6/2010 | Wong et al. |
| 9,551,361 B2 * | 1/2017 | Fujiwara ................. F15B 11/17 |
| 2016/0152261 A1 | 6/2016 | Kuipers et al. |
| 2017/0274930 A1 | 9/2017 | Zhang et al. |

FOREIGN PATENT DOCUMENTS

| | | |
|---|---|---|
| WO | 2006011836 A1 | 2/2006 |
| WO | 2011150010 A2 | 12/2011 |
| WO | 2016085959 A1 | 6/2016 |

\* cited by examiner

HYDRAULIC SYSTEMS AND METHODS FOR POWERING AUXILIARY CIRCUITS

TECHNICAL FIELD

This document pertains generally, but not by way of limitation, to hydraulic systems for machines having a hydraulic implement system and another hydraulic system, such as, but not limited to, a hydraulic steering system. The systems and methods may be included in hydraulic systems for machines, such as, but not limited to, small wheel loaders, snow blowers, asphalt zippers, cold planners and mulchers.

BACKGROUND

Hydraulic systems for machines can include one or more pumps to power various aspects of the machine. Some machines employ hydraulic systems to operate steering components and implement components to accomplish various tasks.

In certain machine configurations, a power supply, such as a gas-powered engine or electric motor, drives various pumps. The types of pumps can include, but are not limited to, a steering pump, hydrostatic pump and implement pump, or any other type of pump or pumps that provide hydraulic power to machines. Aspects of machines that can be powered hydraulically include steering and implement systems, as well as charge, lube or hydraulic drive systems, among others. The hydraulic systems can include components fluidly coupled in one or more hydraulic circuits.

The flow of hydraulic fluid within hydraulic circuits to power these systems and accomplish the functions of these systems can depend on the size and performance characteristics of the pumps and on the engine speed, motor output or battery charge.

SUMMARY

Example hydraulic systems and methods, and applications of such systems and methods in hydraulic systems are described herein. In particular, the systems and methods described herein can facilitate boosting the power of an auxiliary function of an implement on the machine.

In an example hydraulic system, the system facilitates boosting power to an auxiliary function of an implement by supplementing fluid flow from an implement pump with fluid flow from a first pump to the auxiliary function of the implement.

An example system includes a first pump, and implement pump and a control valve. The first pump can be configured to supply a first fluid flow to a first circuit to steer the vehicle. The implement pump can be configured to supply a second fluid flow to an implement circuit to operate a primary function and an auxiliary function of the implement. To boost the hydraulic power delivered to the auxiliary circuit, the auxiliary circuit can also be fluidly coupled to the first circuit by the control valve. The control valve can be positioned downstream (e.g., in the direction of fluid flow) of the implement pump and the first pump. The control valve can be configured to allow at least a portion of the first fluid flow produced by the first pump, to enter the auxiliary circuit and be delivered to the auxiliary function of the implement.

Another example hydraulic system includes a first pump, a first module, an implement pump, an implement valve and a control valve. The first pump can be fluidly coupled to (e.g., in fluid communication with) the first module. The first pump can be configured to deliver a first fluid flow to the first module which actuates first circuit functions of the machine. The implement pump can be configured to supply a second fluid flow. The implement valve can be fluidly coupled to the implement pump and can be configured to selectively deliver the second fluid flow to at least one of a primary function of an implement and an auxiliary function of the implement. The control valve can be fluidly coupled to the auxiliary function of the implement downstream, in the direction of fluid flow, of the implement valve, wherein the control valve is configured to deliver a portion of the first fluid flow from the first pump to the auxiliary function of the implement.

Another example described herein includes a method of operating a machine. The method can include providing power to a first pump configured to provide a first fluid flow to a first module, and providing power to an implement pump configured to provide a second fluid flow to a primary function of an implement and an auxiliary function of the implement. Upon receiving an input from a user control to actuate the primary function of the implement, the method can include sending an instruction to an implement valve to provide at least a portion of the second fluid flow to the primary function of the implement. Upon receiving an input from the user control to actuate a first module, the method can include sending an instruction to a priority valve to provide at least a portion of the first fluid flow to the first module. Upon receiving an input from the user control to operate an auxiliary function of the implement, the method can include sending an instruction to the implement valve to provide at least a portion of the second fluid flow to the auxiliary function of the implement. The method can also include monitoring a first load of the first module. Determining, based on the first load, that the first load has or has not crossed a first threshold load. If the first load threshold has been crossed, the method can include sending instructions to the priority valve and the control valve. Sending instructions to the priority valve can include sending instructions to divert at least a portion of the first fluid flow from the first pump to a control valve configured to provide fluid to the auxiliary function of the implement. Sending instructions to the control valve can include instructing to the control valve to deliver at least a portion of the first fluid flow to the auxiliary function of the implement.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1A:
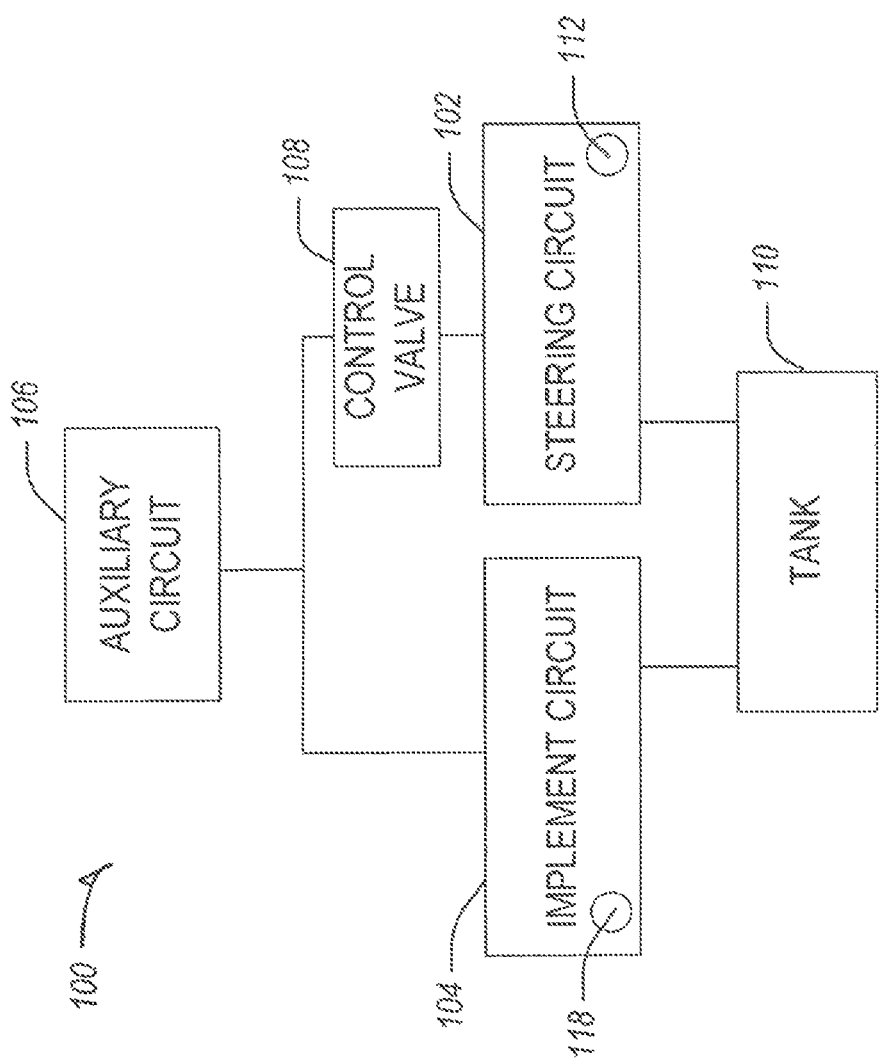
FIG. 1A shows a diagram of an example hydraulic system, including the relationship between various circuits in the hydraulic system, in accordance with at least one example.

Machines, such as small wheel loaders, can include a hydraulic system to operate a steering system and an implement system. In some examples, the implement system can actuate a primary function, and an auxiliary function of the implement (e.g., one or more primary functions of an implement and one or more auxiliary functions of the implement). Example hydraulic systems and methods described herein provide a solution to boost the power available to the auxiliary function of the implement.

Examples of primary functions can include, but are not limited to, actuation of a boom lift, bucket tilt or boom extension (e.g., on a tele-boom loader). Examples of auxiliary functions can include, but are not limited to, rotating an auger of a snow blower, a cutter of a mulcher, or a brush of a sweeper. Auxiliary functions can include any other hydraulic function that is supplementary to the primary function.

Hydraulic components can use power from engines, electric motors and batteries and convert it into hydraulic power which is subsequently converted into a mechanical motion to operate various components of a machine. Currently, the full engine power of some machines, such as small wheel loaders, cannot be fully utilized. In an example, a small wheel loader engine can be rated to a certain power output. However, only a portion of that power can actually be used by the auxiliary function of the implement, even if the auxiliary function would benefit from more power, and there is power available in other parts of the hydraulic system. This typically results in additional power units being needed on work tools for high power demands such as snow blowers, asphalt zippers, cold planners and mulchers, among others.

The present disclosure describes a solution to improve power utilization by the auxiliary function of the implement. As described, auxiliary functions, powered by the implement pump, may receive less than optimal amount of power. By providing a control valve and a priority valve, a portion of the steering pump flow can be diverted from the steering system and combined with the existing implement pump flow to provide a power boost to the auxiliary function of the implement.

To control the amount of fluid flow, and thus hydraulic power provided by the steering pump to the auxiliary function of the implement (herein after, auxiliary function), the steering pump flow to the auxiliary function can be metered by a control valve. The control valve controls the amount of the steering pump flow that is combined with the existing implement pump flow being delivered to the auxiliary function. By providing the auxiliary function with unused power in the steering system, the power of the auxiliary function is boosted, and machine efficiency is improved. As used herein, the terms hydraulic power and power can be used interchangeably.

As described herein, the term valve can include any suitable type of flow managing or flow sharing device that can be used with the systems and methods described herein. Example valves can include, but are not limited to hydro-mechanically controlled valves, electro-magnetically controlled valves, electrically controlled valves, mechanically controlled valves, and electro-mechanically controlled valves.

As described herein, an implement can include multiple implements, and a function can include multiple functions. For example, there can be one or more first (e.g., main, primary) functions of the implement, and one or more auxiliary functions of the implement.

As described herein, the term fluidly coupled can be defined as the fluid contents of two or more components being in fluid communication with each other. In other words, fluidly coupled can include a mechanical coupling that allows communication of fluids, including liquids, gaseous substances and particulate matter, within and between components. For example, the contents (or a portion of the contents) of a first component, can be "in fluid communication" with the contents (or a portion of the contents) of a second component.

As described herein, the terms upstream and downstream can be described with reference to fluid flow. For example, upstream and downstream can be described with reference to the direction of the fluid flow exiting the steering pump or implement pump, where "downstream" indicates the direction the fluid is flowing to or "upstream" indicates a direction opposite the direction of flow of the fluid. In some examples, where fluid flow can change directions, the fluid flow direction can be described with reference to the fluid flow exiting the pump.

In some examples, the fluid flow may be described with reference to the flow in an auxiliary power boosting mode.

Figure 1B:
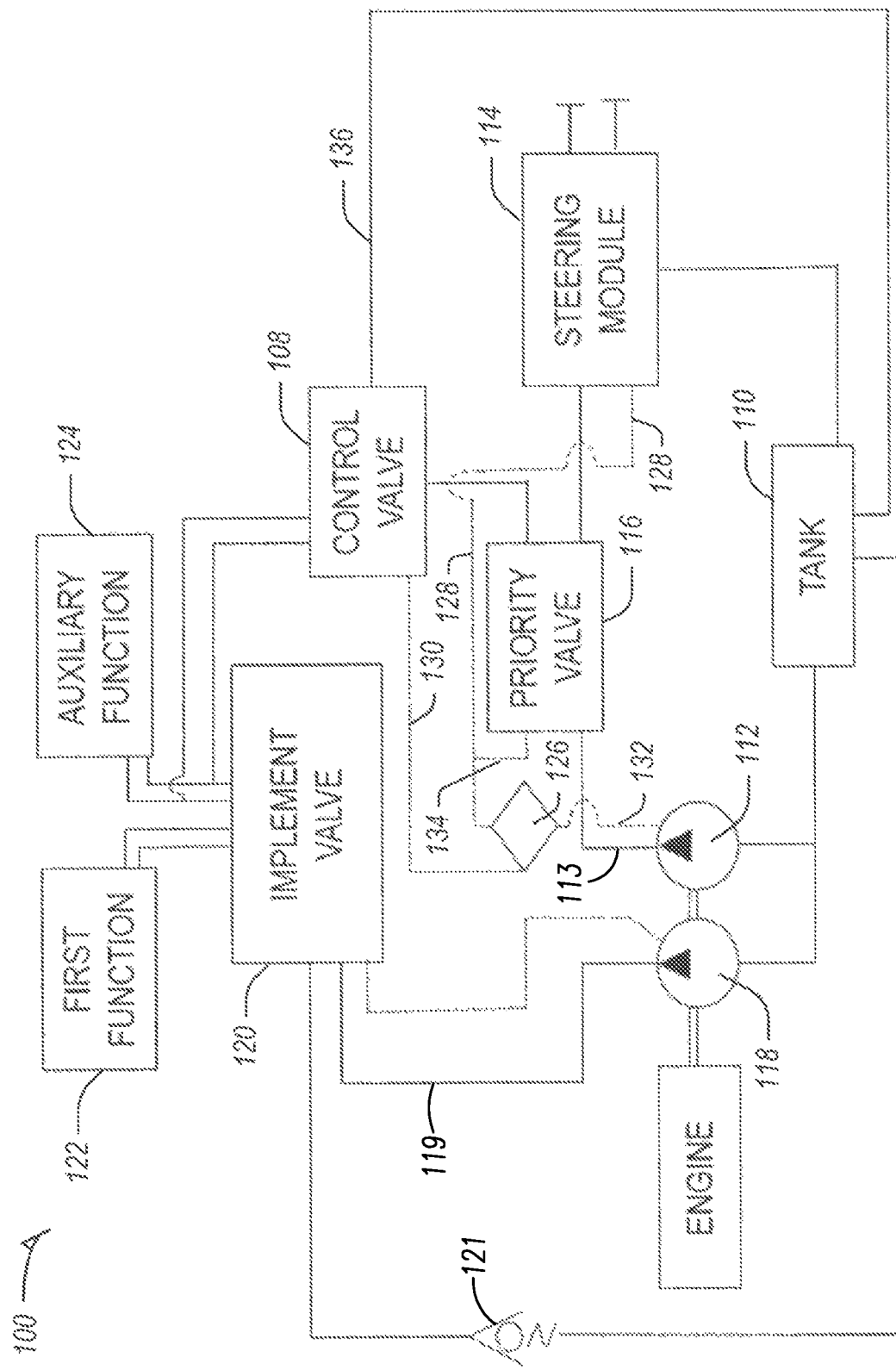
FIG. 1B shows a more detailed schematic of the example hydraulic system of FIG. 1A, in accordance with at least one example.

FIGS. 1A and 1B depict example hydraulic system 100 including multiple hydraulic circuits. In FIG. 1A, the hydraulic system 100 can include a first circuit (e.g., 102), an implement circuit 104, an auxiliary circuit 106, a control valve 108, and a tank 110 configured to store hydraulic fluid. In the example, the first circuit is shown as a steering circuit 102 configured to drive a steering module to provide steering functions to a machine. The implement circuit is another hydraulic circuit configured to drive an implement of the machine. In some examples, a different first circuit (e.g., 102), such as a charge, lube or hydraulic drive circuit, may be provided in place of, or in addition to, the steering circuit 102.

An implement for a machine can include multiple functions. Examples of a primary implement function 122 (hereinafter, primary function) can include, but is not limited to, one or more of actuation of a boom lift, bucket tilt, or tele-boom function. In some examples, an implement may include auxiliary functions, which include, necessitate and/ or are coupled to an auxiliary hydraulic circuit for driving the auxiliary function of the implement. An example of an auxiliary implement function 124 (hereinafter, auxiliary function) can include, but is not limited to, rotating an auger of a snow blower, a cutter of a mulcher, or a brush of a sweeper, multi-purpose bucket, rollout bucket, snow blade, or any other hydraulically powered tool that can be connected to the machine. The auxiliary circuit can receive power from the implement pump via the implement circuit. In the example of FIGS. 1A and 1B, the implement circuit 104 is configured to actuate a primary function 122 of the implement (e.g., one or more main, primary functions). The auxiliary circuit 106 is configured to actuate an auxiliary function 124 of the implement.

Hydraulic system 100 conveys and modulates flow of fluid through various circuits and other portions of the system 100 and the machine on which the system 100 is employed. For example, a first fluid flow 113 is delivered from the tank 110 to components in a first circuit (e.g., 102) by a first pump (e.g., 112). A second fluid flow 119 is delivered from the tank 110 to the components in the implement circuit 104 and the auxiliary circuit 106 by an implement pump 118.

Referring to FIGS. 1A and 1B, in the example hydraulic system 100, the first circuit can be a steering circuit 102 and the first pump can be a steering pump 112. The steering circuit 102 can include the steering pump 112 configured to provide the first fluid flow 113 to the steering circuit 102. The steering circuit 102 can include a steering module 114 that receives the first fluid flow 113 to operate valves and actuators associated with the steering module 114. The first fluid flow 113 delivered to the steering module 114 can aid in steering the machine. In some examples, other circuits and pumps, or additional circuits and pumps can be provided.

The implement circuit 104 can include the implement pump 118 to provide the second fluid flow 119 to a multifunction implement valve 120 (hereinafter, "implement valve"). The implement valve 120 can divide the second fluid flow 119 between multiple functions of an implement. The implement valve 120 can direct at least a portion of the second fluid flow 119 to one or more primary functions 122 of the implement (hereinafter "primary function"). The implement valve 120 can also direct at least a portion of the second fluid flow 119 to the auxiliary circuit 106, to power one or more auxiliary functions 124 of the implement (hereinafter "auxiliary function").

The auxiliary circuit 106 can be fluidly coupled to, and receive fluid from the implement circuit 104. The implement circuit 104 provides a portion of the second fluid flow 119 to the auxiliary circuit 106 to actuate the auxiliary function 124. Controlling the implement valve 120, controls how much hydraulic power the auxiliary function 124 receives from the implement circuit 104.

While the auxiliary circuit 106 already receives power from the implement circuit 104, and while the priority of the steering circuit 102 (e.g., circuits, components) is to provide hydraulic power to steer the vehicle, the steering circuit 102 can share at least a portion of the first fluid flow 113 with the auxiliary circuit 106. By diverting at least a portion of the first fluid flow 113, a power boost can be provided to the auxiliary circuit 106 (and thereby the auxiliary function 124). For example, when there is excess hydraulic power in the steering circuit 102 (e.g., more than is needed to safely steer the vehicle), a portion of the first fluid flow 113 can be diverted to the auxiliary circuit 106 by a priority valve 116.

The priority valve 116 fluidly coupled to the steering pump 112, the steering module 114 and the control valve 108, can prioritize fluid delivery to the steering module 114. When excess first fluid flow 113 is available, the priority valve 116 can divert at least a portion of the first fluid flow 113 to the auxiliary circuit 106 via the control valve 108.

The control valve 108 can fluidly couple the steering circuit 102 to the auxiliary circuit 106. The control valve 108 can deliver the at least a portion of the second fluid flow 119 (diverted by the priority valve 116) to the auxiliary circuit 106 to combine the at least a portion of the second fluid flow 119 with the at least a portion of the first fluid flow 113, thereby boosting the hydraulic power of the auxiliary function 124. In other words, the control valve 108 can be configured to receive at least a portion of the first fluid flow 113 diverted by the priority valve 116 and deliver it to the auxiliary circuit 106 to boost the hydraulic power of the auxiliary function 124.

As shown in FIG. 1B, the control valve 108 can be downstream of the implement pump 118 and the steering pump 112. The control valve 108 can also be described as being downstream of the implement valve 120. In some examples or modes, the control valve 108 can also be described as being upstream of the auxiliary function 124.

In some examples, the control valve 108 can include a drain line 136 that allows fluid to drain to the tank 110 while not going through a pressure check element 121 between the implement valve and the tank 110. This can reduce restrictions in the system 100 and can improve efficiency because the fluid does not have to pass through the implement valve 120 to return to the tank 110. In some examples, the fluid can go directly from the control valve 108 to the tank 110.

In some examples, the control valve 108 can be a one-way valve that allows flow to one side of the auxiliary function 124, and then a return line from the auxiliary function 124 can be a dedicated drain line (e.g., 136) to the tank 110. This can further enhance efficiency. However, in this example, the auxiliary function 124 may move in only one direction, such as in a clock-wise direction, but not in an opposite, counter clock-wise direction.

In some examples, the amount of power (e.g., fluid) provided in an auxiliary power boosting mode can be adjusted continuously. For example, either or both the priority valve 116 and the control valve 108 can be a variable-type valve. Both valves can be adjusted together, or independently of one another to maximize fluid supply to the auxiliary function 124, without compromising any steering function.

In some examples the control valve 108 and the priority valve 116 can be variable valves configured to provide a continuously variable amount of fluid. In some examples, the priority valve 116 can be configured to provide a specified amount of the first fluid flow 113 to the steering module 114 before diverting any fluid to the auxiliary function 124. In other examples the priority valve 116 or the control valve 108 may not be a variable valve, and, instead are configured to be either open or closed.

Control of the system 100 can be accomplished mechanically, electrically, a combination of mechanical or electrical control, among other examples of control. As described herein, load sensing can be accomplished by any suitable means, such as mechanically, hydraulically or electrically, as examples. As described herein, operably coupled can include an electrical connection, a hydraulic connection, or another means for communicating.

As shown in FIG. 1B, some examples can include a load sensing network 126 to monitor and adjust fluid flow in the hydraulic system 100.

In an example where the load sensing network 126 is provided as a mechanical system, or a portion of the load sensing network 126 is a mechanical system, the load sensing network can include a network of load sensing lines that communicate (e.g., receive an input, send an output or instruction) in the form of pressure or flow rate. For example, the steering module 114 can communicate a pressure in the load sensing network 126 via a steering load sensing line 128. The control valve 108 can communicate a pressure via a control valve load sensing line 130. The steering pump 112 can communicate a pressure via a steering pump load sensing line 132. The priority valve 116 can communicate a pressure via a priority valve load sensing line 134. In some examples, in addition to load sensing lines 126, 128, 130, 132, or instead of load sensing lines 126, 128, 130, 132, the load sensing network 126 can include sensors and electrical connections that operably couple the components to one another to form a control system.

Figure 2:
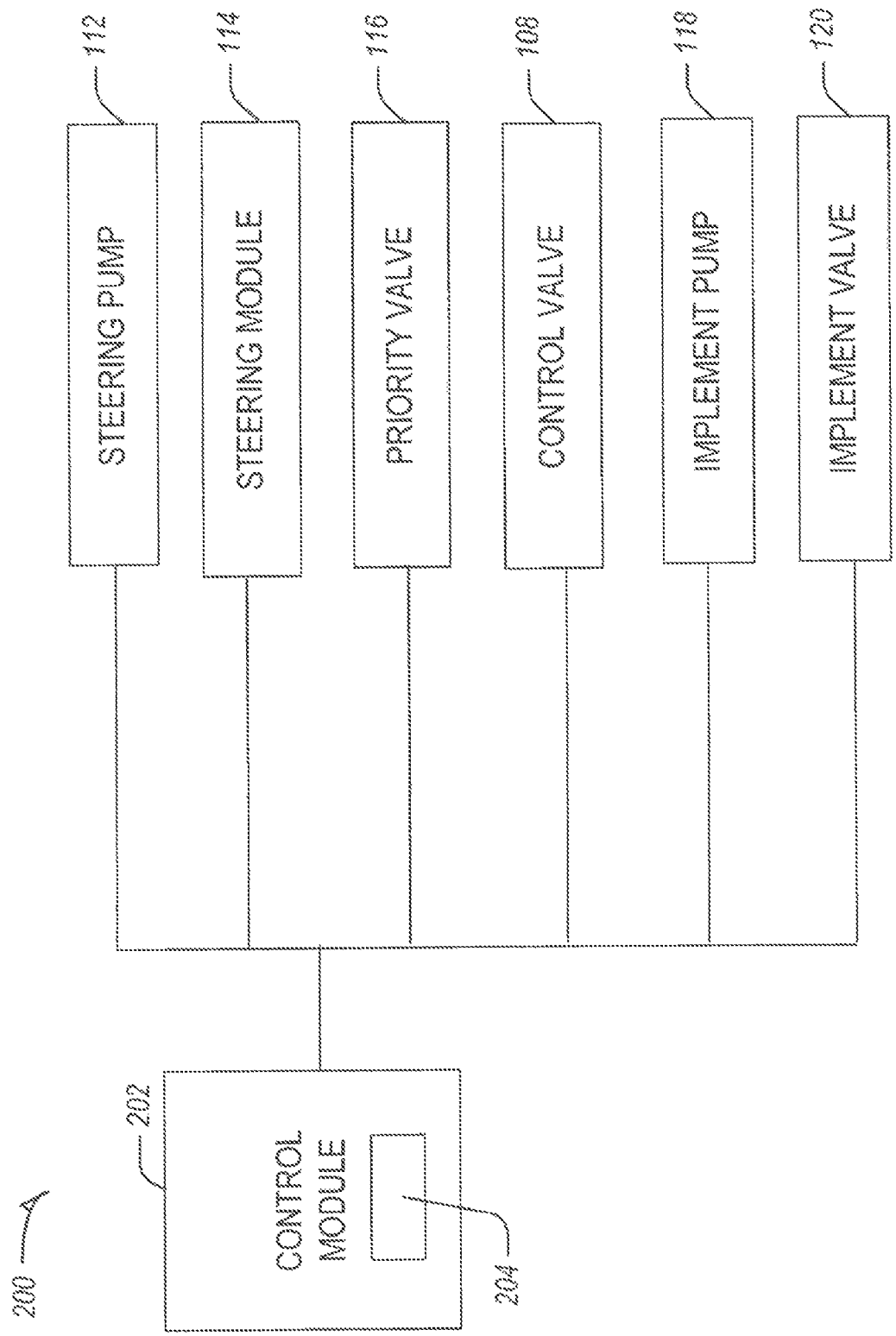
FIG. 2 shows an example control system for controlling the hydraulic system of FIGS. 1A and 1B, in accordance with at least one example.

FIG. 2 shows an example control system 200 for electrically controlling the hydraulic system 100 or a portion of the hydraulic system 100, in accordance with at least one example. As shown in FIG. 2, with support from FIGS. 1A and 1B, the control system 200 can be operably coupled to any of the steering pump 112, steering module 114, priority valve 116, control valve 108, implement pump 118, implement valve 120, and any number of monitoring or actuation devices including sensors (e.g., pressure, flow rate, temperature), valves or injectors, or load sensing lines 126, 128, 130, 132.

In an example where the load sensing network 126, or a portion of the load sensing network 126 is an electrical control system 200, the control system 200 can include a control module 202 including processing circuitry 204 to control fluid flow in the hydraulic system 100. Any number of sensors and actuators can send inputs (e.g., information or instructions) to the control module 202. The control module 202, receiving the inputs can provide information, instructions or output to any of the components of the hydraulic system 100.

Aspects described with respect to the control system 200 can be implemented mechanically via the load sensing network 126, or another load sensing network.

In some examples, the control system 200 can control the output of the steering pump 112 or the implement pump 118, including the amount of the first fluid flow 113 provided to the steering circuit 102, and the amount of the second fluid flow 119 provided to the implement circuit 104 and the auxiliary circuit 106.

In some examples, the control system 200 can control the power boosting provided to the auxiliary circuit 106 by controlling the fluid output of the steering pump 112, the prioritization in the priority valve 116, and the flow rate delivered to the auxiliary circuit 106 at the control valve 108.

In some examples, the control system 200 can control the amount of fluid output of the implement pump 118. In some examples, the control system 200 can control how the first fluid flow 113 is divided between the primary function 122 and the auxiliary function 124 in the implement valve 120.

In some examples, even if an electrical control system 200 is provided, the control system 200 can include a mechanical version of the load sensing network (e.g., 126, FIG. 1B) to communicate mechanically generated information including pressure or flow information. In an electrical control system 200, information from various sensors can sense and monitor load characteristics. Sensors can include pressure sensors, flow sensors or temperature sensors and other types of sensors.

The control system 200 can adjust flow to the steering module 114 and the auxiliary function 124 in a variety of manners. For example, the control module 202 can continuously monitor the auxiliary circuit 106 load and the steering circuit 102 load, and adjust the amount of flow diverted from the steering circuit 102 to the auxiliary circuit 106.

In some examples the control system 200 can monitor the auxiliary function 124 load semi-continuously or intermittently.

In some examples the control system 200 can adjust the amount of flow diverted from the steering circuit 102 to the auxiliary circuit 106 based on one or more predetermined operating conditions having been met. Examples of predetermined operating conditions can include load (e.g., pressure, flow rate, temperature) thresholds being crossed. Examples of load thresholds can include a steering load threshold and an auxiliary load threshold.

In an example, the control module 202 can monitor a steering load and an auxiliary load. If the steering load exceeds a steering load threshold, or a margin above the steering load threshold, this can indicate excess fluid flow is available in the steering circuit 102 to share with the auxiliary circuit 106. In the example, the control system 200 can instruct the priority valve 116 and the control valve 108 to divert fluid flow from the steering circuit 102 to the auxiliary circuit 106. In some examples, the control system 200 can direct the priority valve 116 and the control valve 108 to divert a specified amount of fluid, not just an on/off instruction. In some examples the specified amount can be adjusted (e.g., varied) continuously, semi-continuously or intermittently.

In some examples, aspects of the mechanical load sensing network 126 of FIG. 1B can be combined with aspects of the control system 200 of FIG. 2, to create a hydraulic system 100 including electro-mechanical control. Any suitable combination of electrical and mechanical control that can provide power boosting to the auxiliary circuit 106 from the steering circuit 102 as described, may be provided.

Figure 3:
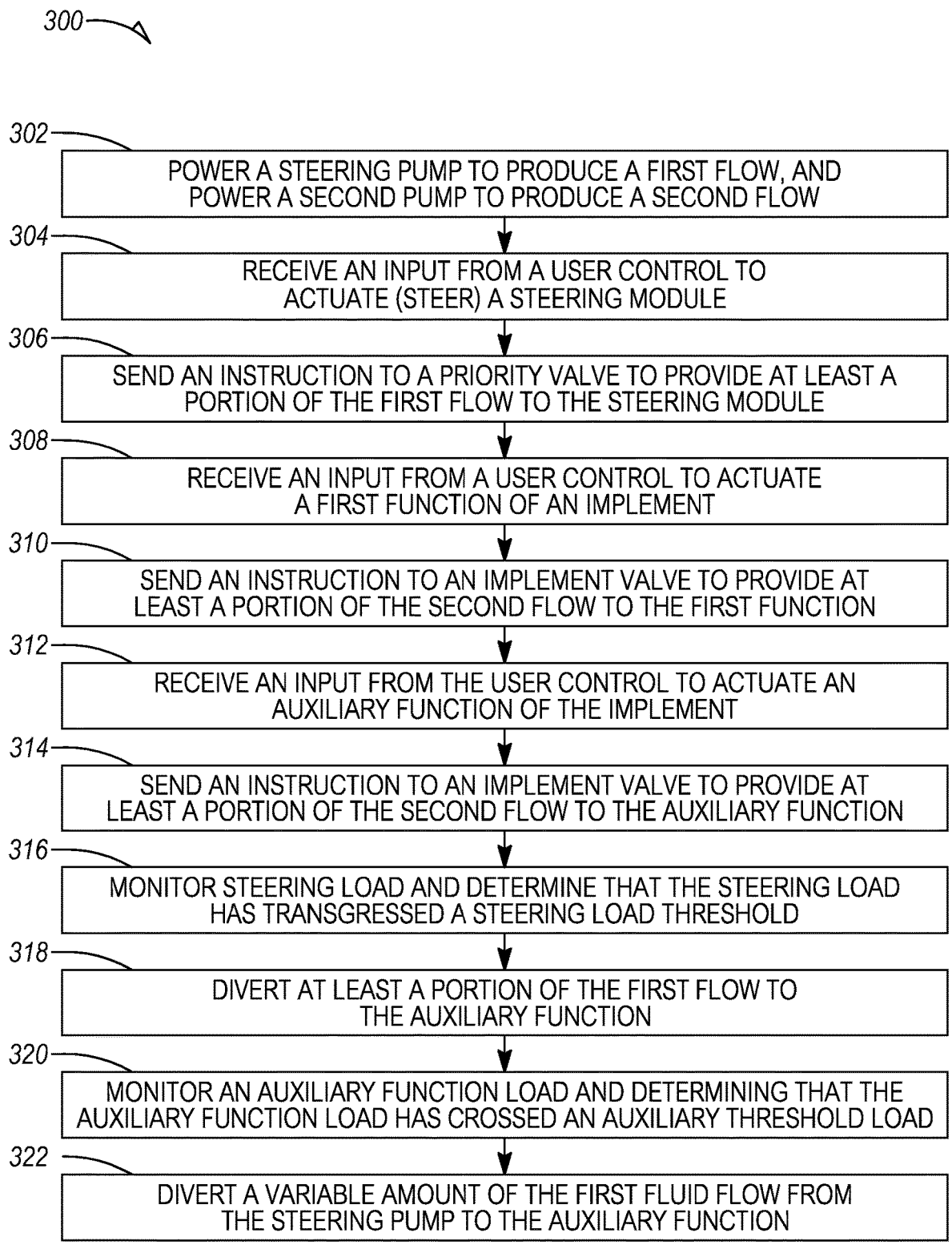
FIG. 3 shows a technique for boosting the power of an auxiliary function of an implement, using the hydraulic system of FIGS. 1A and 1B and the control system of FIG. 2, in accordance with at least one example.

FIG. 3 shows an example technique 300 for boosting power to an auxiliary function 124 (FIG. 1B), using the example system 100 of FIGS. 1A, 1B and control system 200 of FIG. 2, in accordance with at least one example.

The technique 300 can be used with the hydraulic system 100, the load sensing network 126 and/or the control system 200 described herein, but can also be used with other hydraulic systems, load sensing networks and control systems. Alternatively, the hydraulic systems and controls systems described herein can also be used with other techniques.

Technique 300 will be described with reference to the hydraulic system 100 of FIG. 1, and the control system 200 of FIG. 2. Portions of the technique 300 may be used separately from one another, or additional operations may be included.

Operation 302 of the technique 300 can include providing power to a steering pump configured to provide a first fluid flow to a steering module, and providing power to an implement pump configured to provide a second fluid flow to a primary function and an auxiliary function of the implement. Operation 304 can include receiving an input from the user control to actuate a steering module to aid in steering the machine. Operation 306 can include sending an instruction to a priority valve to provide at least a portion of the first fluid flow to the steering module. Operation 308 can include receiving an input from a user control to actuate the primary function of the implement. Operation 310 can include sending an instruction to an implement valve to provide at least a portion of the second fluid flow to the primary function of the implement. Operation 312 can include receiving an input from the user control to operate an auxiliary function of the implement. Operation 314 can include sending an instruction to the implement valve to provide at least a portion of the second fluid flow to the auxiliary function. Operation 316 can include monitoring a steering load of the steering module. The steering load can be monitored intermittently or continuously. Operation 316 can also include determining, based on the monitored steering load, that the steering load has crossed a steering threshold load. Crossing the steering load threshold can include exceeding or falling below the steering load threshold. In some examples, if it is determined that the steering threshold load has been crossed, at least a portion of the first fluid flow may or may not be needed by the steering module. Operation 318 can include sending an instruction to the priority valve to divert at least a portion of the first fluid flow from the steering pump to a control valve configured to control fluid delivery to the auxiliary function.

As a result of the above operations, at least a portion of the first fluid flow and at least a portion of the second fluid flow can be combined to actuate the auxiliary function.

In some examples, other operations can include monitoring 320 an auxiliary function load, and determining, based on the auxiliary function load, that the auxiliary function has crossed an auxiliary threshold load (e.g., exceeds or falls below the auxiliary function threshold). When the auxiliary threshold load has been crossed, the method can include sending 322 an instruction to the priority valve to divert an amount of the first fluid flow from the steeling pump to the auxiliary function (if the steering pump can supply excess fluid). The amount of the first fluid flow delivered may be constant or continuously variable to match the needs of the auxiliary function (e.g., auxiliary circuit).

In some examples, other operations can include sensing an operating condition at a control valve, such as a load, and diverting at least a portion of the first or second fluid flows to a drain line that bypasses the implement valve if the predefined operation condition crosses a predefined operation condition threshold. For example, exceeding a load, pressure, flow rate or temperature.

In an example, the control system 200 can include a machine readable medium to perform any of the steps of the technique 300. In an example, the term "machine readable medium" can include a single medium or multiple media (e.g., a centralized or distributed database, or associated caches and servers) configured to store one or more instructions.

The term "machine readable medium" can include any medium that is capable of storing, encoding, or carrying instructions for execution by a machine and that cause the machine to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

INDUSTRIAL APPLICABILITY

An example of industrial applications that uses hydraulic systems to power hydraulic steering and implements, include, but are not limited to, machines including small wheel loaders, snow blowers, asphalt zippers, cold planners and mulchers.

These machines, can include a hydraulic system to operate one or more main functions (e.g., implements), one or more auxiliary functions (e.g., implements), and another function such as a steering system. Example hydraulic systems and methods described herein provide a solution to boost the power available to the auxiliary functions. An example of an auxiliary function can be a rotating auger on a snow blower.

The present disclosure describes a solution to improve power utilization by the auxiliary functions (e.g., rotating auger). The systems and methods describe herein fluidly couples a steering pump and an implement pump through a priority valve and a control valve. The priority valve can divert a suitable portion of the steering pump flow to be combined with the implement pump flow via the control valve to be used by the rotating auger. This enables the power of the rotating auger to be boosted.

To control the amount of flow, and thus power, provided by the steering pump to the rotating auger, the steering pump flow to the rotating auger can be metered by a control valve. The control valve can control the amount of the steering pump flow that is combined with the implement pump flow being delivered to the rotating auger. By providing the rotating auger with unused power in the steering system, the power of the rotating auger is boosted, and the snow blower efficiency is improved.

What is claimed is:

1. A method of operating a machine, the method comprising:
   providing power to a first pump configured to provide a first fluid flow to a first module configured to actuate functions of the machine;
   providing power to an implement pump configured to provide a second fluid flow to a primary function of an implement and an auxiliary function of the implement;
   receiving an input from a user control to actuate the primary function of the implement;
   sending an instruction to an implement valve to provide at least a portion of the second fluid flow to the primary function of the implement;
   receiving an input from the user control to actuate the first module;
   sending an instruction to a priority valve to provide at least portion of the first fluid flow to the first module;
   receiving an input from the user control to operate the auxiliary function of the implement;
   sending an instruction to the implement valve to provide at least a portion of the second fluid flow to the auxiliary function of the implement;
   monitoring a load of the first module;
   determining, based on the load, that the load has crossed a threshold load; and
   sending an instruction to the priority valve to divert at least a portion of the first fluid flow to a control valve configured to provide fluid to the auxiliary function of the implement;
   sending an instruction to the control valve to deliver at least a portion of the first fluid flow to the auxiliary function of the implement; and
   monitoring an auxiliary function load;
   determining, based on the auxiliary function load, that the auxiliary function load has crossed an auxiliary threshold load; and
   sending an instruction to the priority valve to divert a variable amount of the first fluid flow from the first pump to the auxiliary function of the implement.

2. The method of claim 1, wherein the first pump is a steering pump configured to provide a first fluid flow to a steering module, and wherein the steering module is configured to actuate steering functions of the machine.

3. The method of claim 1, further comprising combining at least a portion of the first fluid flow and at least a portion of the second fluid flow to actuate the auxiliary function of the implement, and wherein the control valve is configured to provide a variable amount of the first fluid flow to the auxiliary function of the implement.

4. The method of claim 1, further comprising:
   sensing an operating condition at the control valve; and
   diverting fluid to a drain line if a predefined operating condition is exceeded.

* * * * *